United States Patent [19]

Fuse

[11] Patent Number: 4,762,385
[45] Date of Patent: Aug. 9, 1988

[54] LASER BEAM ADMITTING DEVICE

[75] Inventor: Jiro Fuse, Kasukabe, Japan

[73] Assignee: Kabushiki Kaisha Machida Seisakusho, Tokyo, Japan

[21] Appl. No.: 895,168

[22] Filed: Aug. 11, 1986

[30] Foreign Application Priority Data

Sep. 2, 1985 [JP] Japan .......................... 60-133158[U]

[51] Int. Cl.$^4$ ................................................ G02B 6/32
[52] U.S. Cl. ............................... 350/96.18; 350/96.10; 350/96.20; 350/96.33
[58] Field of Search ............... 350/96.10, 96.15, 96.18, 350/96.20, 96.33; 250/227, 552; 357/17, 19, 30, 74

[56] References Cited

U.S. PATENT DOCUMENTS

| | | | |
|---|---|---|---|
| 4,398,790 | 8/1983 | Righini et al. | 350/96.18 |
| 4,521,070 | 6/1985 | Sottini et al. | 350/96.15 |
| 4,676,586 | 6/1987 | Jones et al. | 350/96.20 |

FOREIGN PATENT DOCUMENTS

0015095  9/1980  European Pat. Off. .
2517019 10/1976  Fed. Rep. of Germany ... 350/96.18

Primary Examiner—John Lee
Attorney, Agent, or Firm—Kane, Dalsimer, Sullivan, Kurucz, Levy, Eisele and Richard

[57] ABSTRACT

A laser beam admitting device comprises a support structure for supporting an optical fiber having a core and a clad layer surrounding the core. Laser beam is admitted into a beam admitting end of the optical fiber through a condensing optical system. The support structure supports the optical fiber at a supporting location remote from the beam admitting end thereof. The support structure includes a tubular portion extending from the supporting location toward the beam admitting end of the optical fiber. The tubular portion has its inner diameter greater than an outer diameter of the clad layer of the optical fiber. A beam leakage material is disposed between the tubular portion and the clad layer, to allow the laser beam admitted into the clad layer to be diffused to the tubular portion.

18 Claims, 2 Drawing Sheets

LASER BEAM ADMITTING DEVICE

BACKGROUND OF THE INVENTION

The present invention relates to a device for admitting a laser beam into an end of an optical fiber.

Unlike normal or usual light, laser beam is uniform in phase and is superior in convergence and, therefore, it is possible for the laser beam to concentrate beam energy of extremely high density on a narrow area. Accordingly, the laser beam is applicable to machinings, medical treatments and the like. The laser beam may be supplied by a laser beam generator through an optical fiber. In this case, the laser beam from the generator is admitted into one end of the optical fiber through a condensing optical system and is irradiated from the other end of the optical fiber.

FIGS. 1 and 2 illustrate a laser beam admitting device of the prior art, which comprises a metallic support structure 50. A support bore 51 is formed in the support structure 50 so as to extend along a longitudinal axis thereof, and is comprised of a large-diameter bore section 51a and a small-diameter bore section 51b located at an axial forward end of the bore section 51a.

The support structure 50 is adapted to support an optical fiber 10 so as to locate a beam admitting end 10a of the optical fiber 10 at a focus position of a convex lens 20 which serves as a condensing optical system. In FIG. 1, the optical fiber 10 is illustrated as having its diameter exaggerated as compared with an actual one.

The optical fiber 10 is comprised of a core 11 and a clad layer 12 surrounding the core 11. In addition, the optical fiber 10 is covered with an envelope 14 through a resilient support layer 13. The optical fiber 10 has its forward end portion from which the resilient support layer 13 and the envelope 14 are removed so that the clad layer 12 is exposed.

The envelope 14 of the optical fiber 10 is inserted into and supported by the large-diameter bore section 51a in the support structure 50, and the exposed clad layer 12 of the optical fiber 10 is inserted into and supported by the small-diameter bore section 51b.

With the construction as described above, a laser beam of high energy condensed by the convex lens 20 is admitted from the beam admitting end 10a of the optical fiber 10 into the core 11 thereof, passes through the core 11, and is irradiated from the other end of the optical fiber 10.

When the optical fiber 10 is supported by the support structure 50 constructed as described above, various problems are encountered. Specifically, since the core 11 of the optical fiber 10 is extremely fine in diameter, it is difficult to condense all of the laser beam onto the narrow area of the core end, and there may be a case where a part of the laser beam is admitted into the clad layer 12, as shown in FIG. 2. The laser beam admitted into the clad layer 12 passes through the core 11 while being refracted, and is again admitted into the clad layer 12 while being further refracted. In a portion of the clad layer 12 projecting from a forward end face of the support structure 50, the laser beam is totally reflected from an outer circumferential surface of the clad layer portion, and is transmitted toward the other end of the optical fiber 10 while repeating the aforesaid refraction. At a location where the clad layer 12 is surrounded by the small-diameter bore section 51b in the support structure 50, however, the laser beam reaching an inner peripheral surface of the small-diameter bore section 51b is absorbed thereat and, as a result, the beam energy is converted into heat. Since the inner peripheral surface of the small-diameter bore section 51b is relatively small in surface area and an amount of heat generated per unit area is great, problems occur that the support structure 50 is locally heated to a high temperature; the forward end portion of the optical fiber 10 is melted down and damaged; and the like.

In order to avoid the aforementioned problems, it may be considered as a possibility to take such a measure as to transmit the laser beam admitted into the clad layer 12, through the optical fiber 10, without conversion of the admitted laser beam to heat in the vicinity of the beam admitting end 10a of the optical fiber 10. In this case, however, it will be presumed that some problems arise. That is, if the optical fiber 10 is required to be bent at an acute angle, the laser beam admitted into the clad layer 12 would leak from the bent portion so that the envelope 14 at the bent portion is heated and softened. By this softening, the bent portion would tend to be further bent, and such a vicious circle would be caused that the further bending promotes the leakage of the laser beam. As a result, a mechanical breakage due to stress concentration or a melt-down due to heat might occur.

OBJECT AND SUMMARY OF THE INVENTION

An object of the present invention is to provide a laser beam admitting device which can prevent unnecessary and harmful laser beam admitted into a clad layer at a beam admitting end of an optical fiber from being transmitted toward the other end thereof, and can suppress local heat generation of a support structure in the vicinity of the beam admitting end.

According to the present invention, there is provided a laser beam admitting device comprising:

optical fiber means having a core and a clad layer surrounding the core;

a condensing optical system through which a laser beam is admitted into a beam admitting end of the optical fiber means; and a support structure for supporting the optical fiber means at a supporting location remote from the beam admitting end thereof, the support structure having a tubular portion formed so as to extend from the supporting location toward the beam admitting end of the optical fiber means, the tubular portion having its inner diameter greater than an outer diameter of the clad layer of the optical fiber means, the support structure including a beam leakage material disposed between the tubular portion and the clad layer of the optical fiber means, to allow the laser beam admitted into the clad layer to be diffused to the tubular portion.

DETAILED DESCRIPTION

Figure 5:
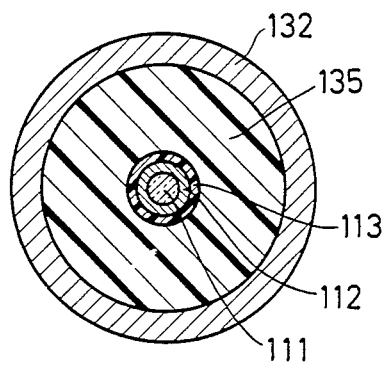
FIG. 5 is a cross-sectional view taken along the line V—V in FIG. 3.
Figure 3:
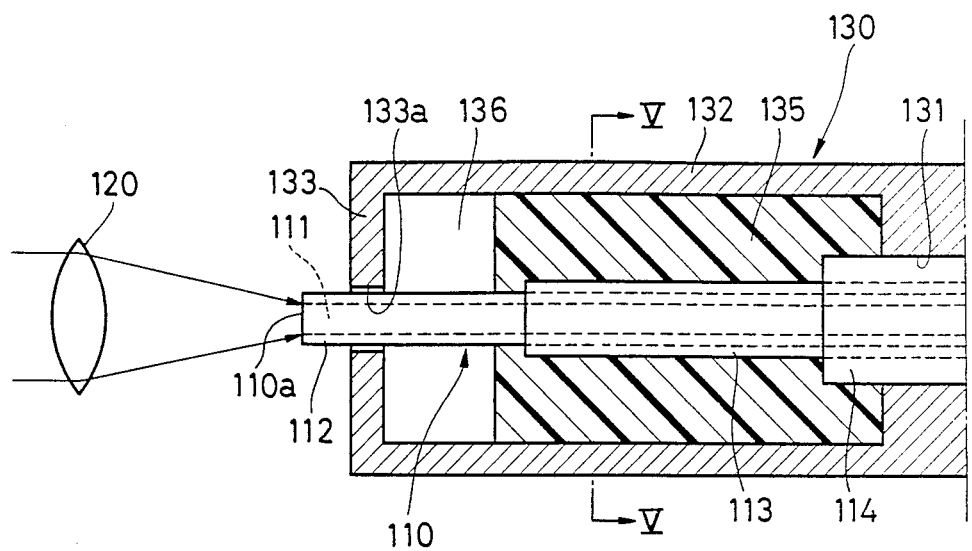
FIG. 3 is a view similar to FIG. 1, but showing a laser beam admitting device in accordance with an embodiment of the invention.
Figure 4:
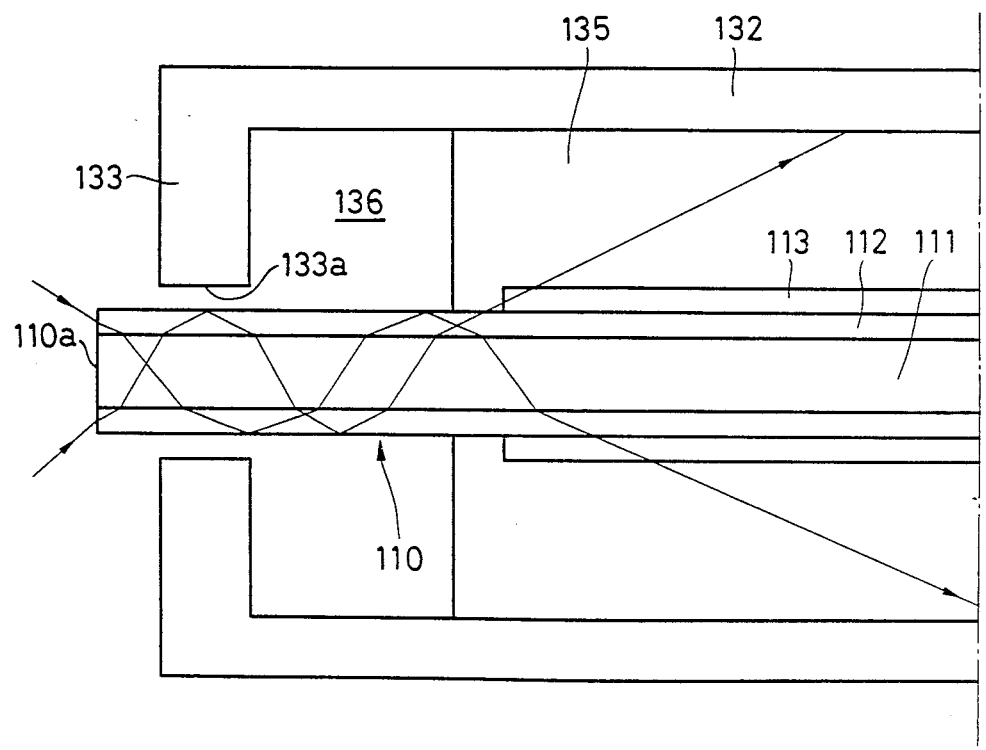
FIG. 4 is a view similar to FIG. 2, but illustrating a path of the laser beam admitted into a clad layer of an optical fiber shown in FIG. 3.

The invention will now be described, by way of example, with reference to FIGS. 3 through 5 of the drawings.

Figure 1:
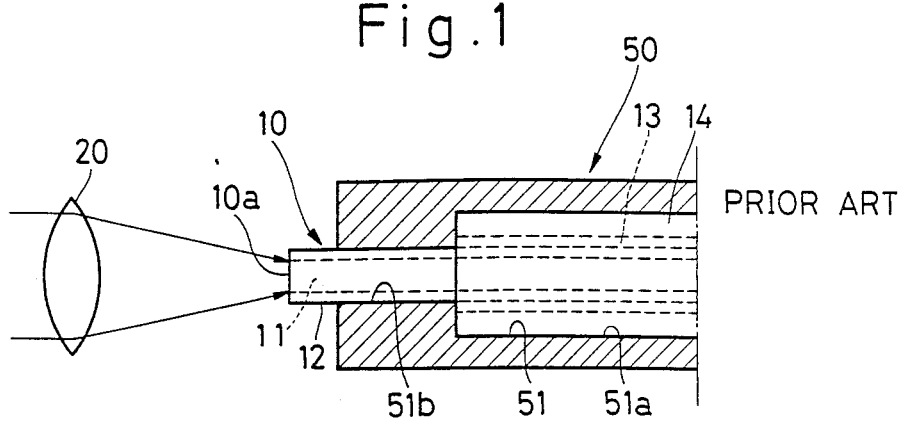
FIG. 1 is a fragmental cross-sectional view showing a laser beam admitting device of the prior art.
Figure 2:
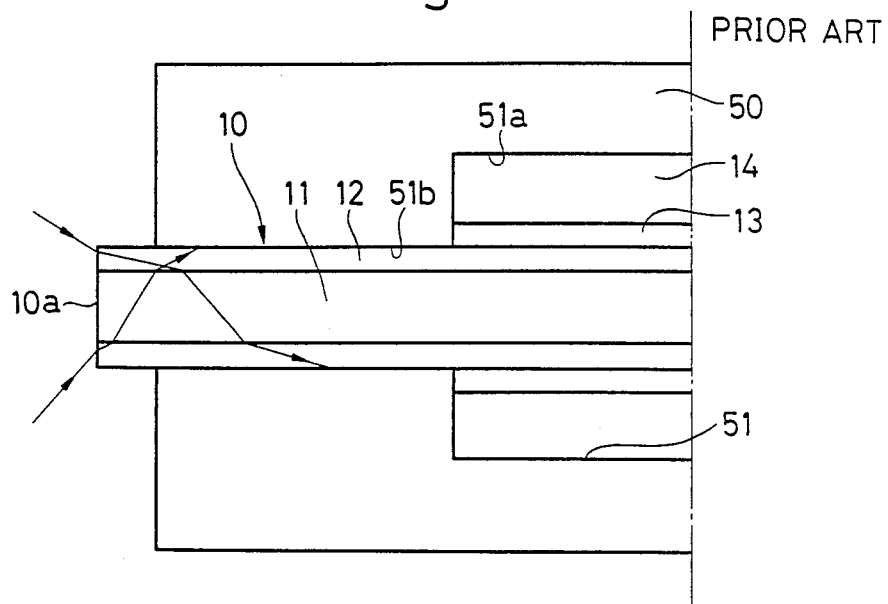
FIG. 2 is a fragmental schematic, enlarged view illustrating a path of the laser beam admitted into a clad layer of an optical fiber shown in FIG. 1.

An optical fiber 110 is surrounded by an envelope 114 through a resilient support layer 113, similarly to the optical fiber 10 described previously with reference to FIGS. 1 and 2. The resilient support layer 113 projects from a forward end of the envelope 114, and the optical fiber 110 projects from the resilient support layer 113. The optical fiber 110 is comprised of a core 111 formed of quartz, for example, and a clad layer 112 formed of quartz lower in refractive index than the core 111. The resilient support layer 113 is formed of resin such as, for example, silicone resin, which is transparent and heat-resistant and has a refractive index higher than that of the clad layer 112. The envelope 114, is formed of resin such as, for example, Nylon, Teflon ® or the like. In FIG. 3, the optical fiber 110 is illustrated as having its diameter exaggerated as compared with an actual one.

The laser beam admitted device comprises a convex lens 120 serving as a condensing optical system for condensing the laser beam from a laser beam generator (not shown), and an elongated, metallic support structure 130 for supporting the optical fiber 110 so as to locate a beam admitting end 110a thereof at a focus position of the convex lens 120.

A support bore 131 is formed in the support structure 130 so as to extend along its longitudinal axis. The support structure 130 has a tubular portion 132 on the side of a forward end of the support bore 131. The tubular portion 132 is formed so as to have its inner diameter which is greater than the diameter of the support bore 131 and which is considerably greater than the outer diameter of the clad layer 112 of the optical fiber 110. A forward end of the tubular portion 132 is substantially closed by an end wall 133 having formed at its center an inserting bore 133a which has a diameter greater than the outer diameter of the clad layer 112 of the optical fiber 110.

A portion of the envelope 114 adjacent its forward end is inserted in and supported by the support bore 131 in the support structure 130 so that the optical fiber 110 is supported by the support structure 130. The optical fiber 110 passes through the inserting bore 133a with a gap left therebetween, and projects from a forward end face of the support structure 130. An annular space between the tubular portion 132 and the optical fiber 110 is filled with a beam leakage material 135, except for an annular non-filled space portion 136 which extends inwardly from an inner face of the end wall 133 along the optical fiber 110 a predetermined distance. The beam leakage material 135 is filled into the space within the tubular portion 132 through an orifice or orifices (not shown) formed through the wall of the tubular portion 132. The beam leakage material 135 is formed of silicone resin, for example, and has a refractive index on the same order as that of the resilient support layer 113. The beam leakage material 135 serves also to support the optical fiber 110.

With the construction as described above, a major part of the laser beam condensed by the convex lens 120 is admitted into an end face of the core 111. Since the core 111 has its refractive index higher than that of the clad layer 112 and the incidence angle of the laser beam, i.e., the angle of the laser beam with respect to an axis of the core 111 is within a predetermined range, the laser beam is transmitted to the other end face of the core 111 while being totally reflected from the outer peripheral surface of the core 111, and is irradiated from the other end face of the core 111.

The core 111 is extremely fine in diameter, and it is difficult to condense all of the laser beam onto the narrow area. Thus, there may be a case where a part of the laser beam is admitted into the clad layer 112 as shown in FIG. 4. In this case, the laser beam admitted into the clad layer 112 passes through the core 111 while being refracted, and is again admitted into the clad layer 112 while being further refracted. The forward end portion of the optical fiber 110 is not brought into direct contact with the support structure 130, and air surrounds the clad layer 112 at the forward end portion of the optical fiber 110. Since air is low in refractive index as compared with the clad layer 112, the laser beam is totally reflected from the outer peripheral surface of the clad layer 112 and is again transmitted to the core 111 and the clad layer 112. In due course, the laser beam reaches the outer peripheral surface of the clad layer 112 surrounded by the resilient support layer 113 and the beam leakage material 135. Since the resilient support layer 113 and the beam leakage material 135 are higher in refractive index than the clad layer 112, the laser beam leaks from the clad layer 112 into the resilient support layer 113 and the beam leakage material 135 so that the laser beam impinges against the inner peripheral surface of the tubular portion 132 of the support structure 130 and is absorbed thereat. As a result, the beam energy is converted to heat. Since the inner peripheral surface of the tubular portion 132 is relatively great in surface area, even if the heat is generated, it is possible to considerably reduce an amount of laser beam energy absorbed per unit area, i.e., a local heat generation, as compared with the prior art device. Thus, the problems would not arise that the support structure 130 is heated to a high temperature; the optical fiber 110 is melted down and damaged; and the like.

The non-filled space portion 136 formed between the end wall 133 of the support structure 130 and the beam leakage material 135 plays the following role. That is, should the beam leakage material 135 is filled up to the end wall 133, there would be a fear that a part of the laser beam leaking from the beam leakage material 135 impinges against the inner peripheral edge of the inserting bore 133a so that the inner peripheral edge portion of the inserting bore 133a is heated to a high temperature. In addition, there would also be a fear that upon the filling of the beam leakage material 135, a part of the material enters the inserting bore 133a and the laser beam passing through the material entering the inerting bore 133a causes the peripheral surface of the inserting bore 133a to be heated to a high temperature. The non-filled space portion 136 is provided for obviating the problems mentioned above.

Since, as described above, the laser beam admitted into the clad layer 112 leaks from the resilient support layer 113 and the beam leakage material 135, the laser beam is not substantially transmitted through the optical fiber 110. Accordingly, should the optical fiber 110 be bent at its intermediate portion at an acute angle, the laser beam would not leak from the bent portion. Thus, it is possible to avoid a mechanical breakage and/or a melt-down due to heat, of the optical fiber 110 at the bent portion thereof.

The invention should not be limited to the above-described specific embodiment, and various modifications and alternations may be made to the invention. For instance, although the embodiment of the invention has been described as including the resilient support layer 113 and the beam leakage material 135 which have their respective refractive indexes higher than that of the clad layer 112, these components 113 and 135 may have their respective refractive indexes lower to a certain degree than that of the clad layer 112. It is to be noted, however, that in a case where the beam leakage material 135 and the resilient support layer 113 are higher in refractive index than the clad layer 112, it is possible to much more remove the laser beam admitted into the clad layer 112. Even if the beam leakage material 135 and the resilient support layer 113 are lower in refractive index to a certain degree than the clad layer 112, it is possible to remove a major part of the laser beam admitted into the clad layer 112, because the respective refractive indexes of the beam leakage material 135 and the resilient support layer 113 are closer to that of the clad layer 112 than that of air. In particular, the laser beam incident upon the clad layer 112 is high in leakage rate, because the laser beam incident upon the clad layer 112 is much an outer peripheral edge component of the condensed laser beam and is great in incidence angle as compared with the laser beam incident upon the core 111.

In the embodiment described above, the resilient support layer 113 is interposed between the clad layer 112 and the beam leakage material 135 to play also a role as a beam leakage material for promoting the leakage of the laser beam. However, in a case where the refractive index of the beam leakage material 135 is higher than that of the resilient support layer 113, advantage is gained if the clad layer 112 is surrounded by the beam leakage material 135 without the interposition of the resilient support layer 113.

Moreover, the clad layer of the optical fiber may be formed of a resilient material, to allow the resilient support layer to be dispensed with.

As described above, with the construction in accordance with the invention, the support structure is not brought into direct contact with the clad layer of the optical fiber, and it is possible to diffuse the laser beam admitted into the clad layer, to the large-diameter tubular portion of the support structure, by means of the beam leakage material. Thus, it is made possible to avoid such disadvantages that the support structure is heated to a high temperature; the optical fiber is melted down and damaged; and the like. In addition, since the laser beam admitted into the clad layer leaks in the vicinity of the beam admitting end of the optical fiber, the laser beam admitted into the clad layer is not transmitted toward the other end of the optical fiber and, accordingly, should the optical fiber be bent at its intermediate portion, the laser beam would not leak from the bent portion. Thus, it is made possible to obviate such disadvantages as a breakage, melt-down and the like of the optical fiber.

What is claimed is:

1. A laser beam admitting device comprising:
   optical fiber means having a core and a clad layer surrounding said core;
   a condensing optical system through which a laser beam is admitted into a beam admitting end of said optical fiber means; and
   a support structure for supporting said optical fiber means at a supporting location remote from said beam admitting end thereof, said support structure having a tubular portion formed so as to extend from said supporting location toward said beam admitting end of said optical fiber means, said tubular portion having its inner diameter greater than an outer diameter of said clad layer of said optical fiber means, said support structure including a beam leakage material disposed between said tubular portion and said clad layer of said optical fiber means to permit the laser beam admitted into said clad layer to leak through said beam leakage material to cause the leaking laser beam to impinge against an inner peripheral surface of said tubular portion, which has an area greater than that of an outer peripheral surface of said optical fiber means.

2. A laser beam admitting device as defined in claim 1, wherein said optical fiber means has a forward end portion adjacent said beam admitting end, said forward end portion projecting from said beam leakage material and being surounded by air.

3. A laser beam admitting device as defined in claim 2, wherein said support structure includes an end wall substantially closing an end of said tubular portion adjacent said beam admitting end of said optical fiber means, said end wall having an inserting bore formed at its center, said forward end portion of said optical fiber means passing through said inserting bore so as to have said beam admitting end projecting outwardly from said end wall, with a gap left between said inserting bore and said optical fiber means.

4. A laser beam admitting device as defined in claim 3, wherein said beam leakage material is filled in a space between said tubular portion of said support structure and said optical fiber means except for a non-filled space portion which extends inwardly from an inner face of said end wall along said optical fiber means a predetermined distance.

5. A laser beam admitting device as defined in claim 4, wherein said core of said optical fiber means is formed of quartz, and said clad layer of said optical fiber means is formed of quartz having its refractive index lower than that of said core.

6. A laser beam admitting device as defined in claim 5, wherein said beam leakage material has its refractive index higher than that of said clad layer.

7. A laser beam admitting device as defined in claim 6, wherein said beam leakage material is formed of silicone resin.

8. A laser beam admitting device as defined in claim 7, wherein said optical fiber means includes a resilient support layer surrounding said clad layer and an envelope surrounding said resilient support layer.

9. A laser beam admitting device as defined in claim 8, wherein said support structure has formed therein a support bore, said envelope projects from said support bore, said resilient support layer projects from said envelope, and said clad layer projects from said resilient support layer.

10. A laser beam admitting device as defined in claim 9, wherein said resilient support layer is formed of transparent silicone resin having its refractive index higher than that of said clad layer and on the same order as that of said beam leakage material.

11. A laser beam admitting device as defined in claim 1, wherein said support structure having said tubular portion is formed of a metal.

12. A laser beam admitting device comprising:
optical fiber means having a core and a clad layer surrounding said core;
a condensing optical system through which a laser beam is admitted into a beam admitting end of said optical fiber means; and
a support structure having formed therethrough a support bore, said optical fiber means being supported directly by said support bore and having an end portion, adjacent said beam admitting end, which projects from an end of said support bore toward said condensing optical system, said support structure having a tubular portion surrounding the projecting end portion of said optical fiber means, said tubular portion having an inner peripheral surface cooperating with an outer peripheral surface of the projecting end portion of said optical fiber means to define therebetween a space filled with a beam leakage material to permit the laser beam admitted into said clad layer to leak through said beam leakage material to cause the leaking laser beam to impinge against the inner peripheral surface of said tubular portion, which has a surface area greater than that of the outer peripheral surface of the projecting end portion of said optical fiber means.

13. A laser beam admitting device as defined in claim 12, wherein said support structure including said tubular portion is formed of a metal.

14. A laser beam admitting device as defined in claim 12, wherein said projecting end portion of said optical fiber means has a forward section adjacent said beam admitting end, which projects from said beam leakage material and which is surrounded by air.

15. A laser beam admitting device as defined in claim 14, wherein said support structure includes an end wall substantially closing an end of said tubular portion adjacent said beam admitting end of said optical fiber means, said end wall having an inserting bore formed at its center, said forward section of the projecting end portion of said optical fiber means passing through said inserting bore so as to have said beam admitting end projecting outwardly from said end wall, with a gap left between said inserting bore and said forward section of said optical fiber means.

16. A laser beam admitting device as defined in claim 15, wherein said beam leakage material is filled into said space between the inner peripheral surface of said tubular portion and the outer peripheral suface of said projecting end portion of said optical fiber means except for a nonfilled space portion which extends inwardly from an inner face of said end wall along said optical fiber means for a predetermined distance.

17. A laser beam admitting device as defined in claim 16, wherein said clad layer of said optical fiber means has a refractive index lower than that of said core, and said beam leakage material has its refractive index higher than that of said clad layer.

18. A laser beam admitting device as defined in claim 17, wherein said beam leakage material is formed of silicone resin.

* * * * *